UNITED STATES PATENT OFFICE.

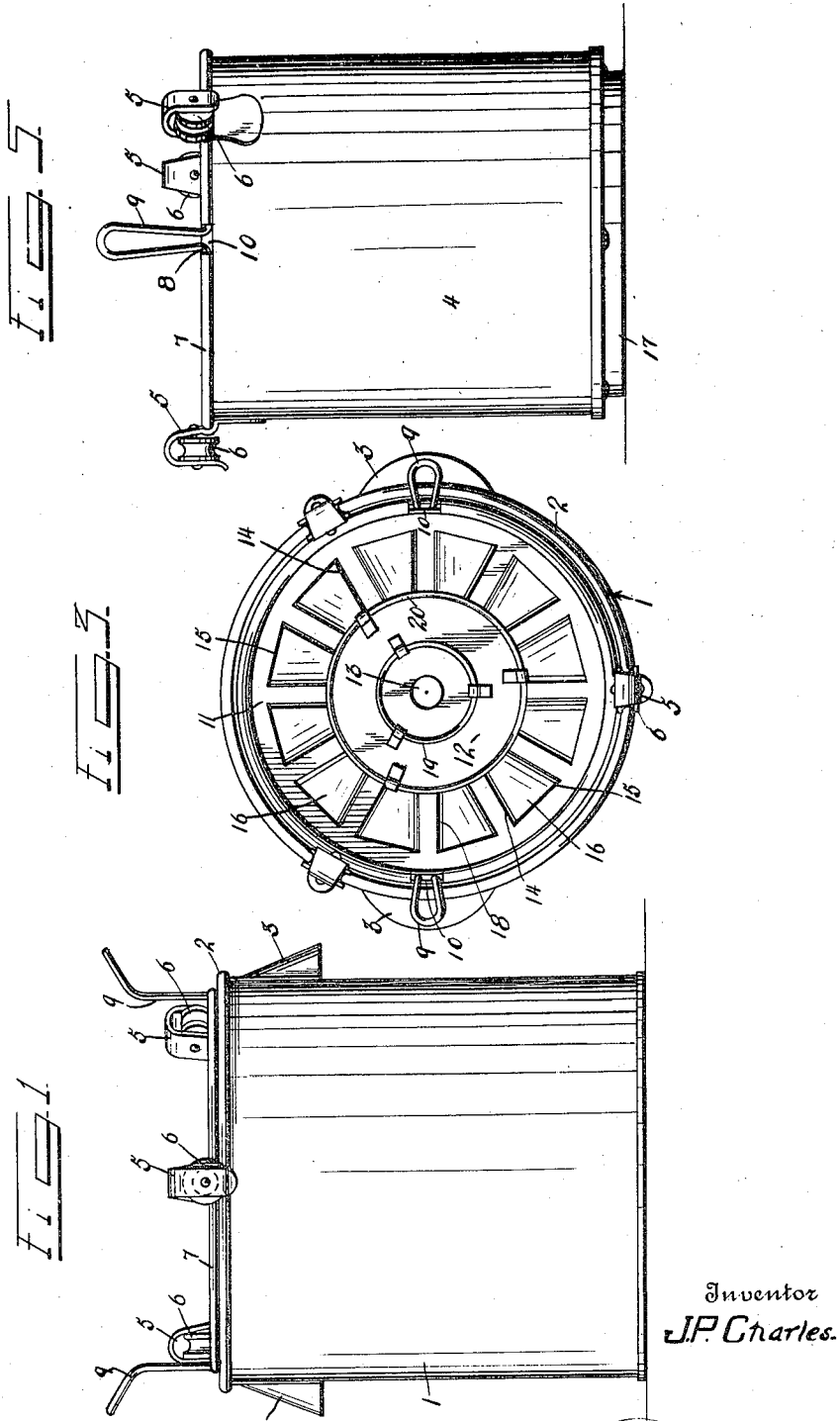

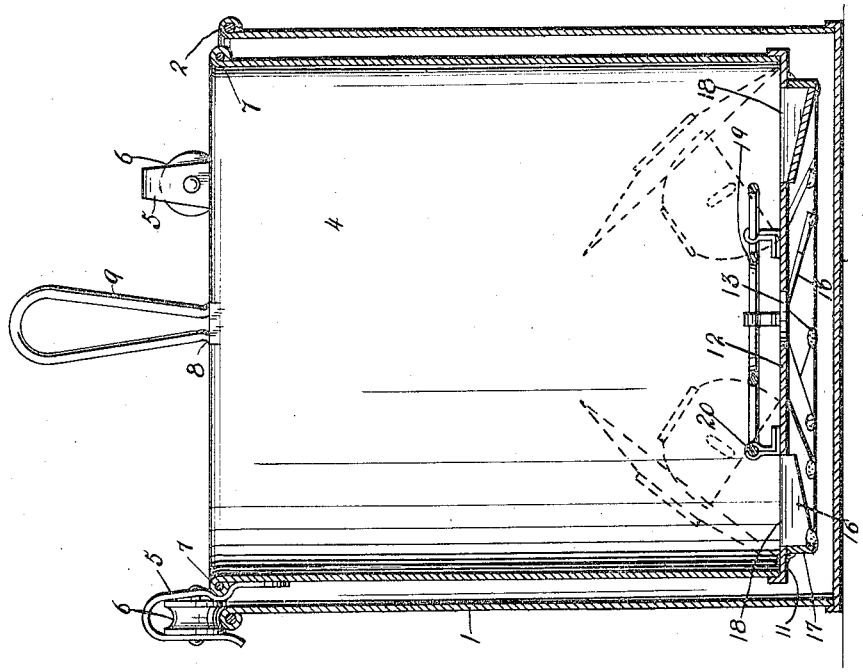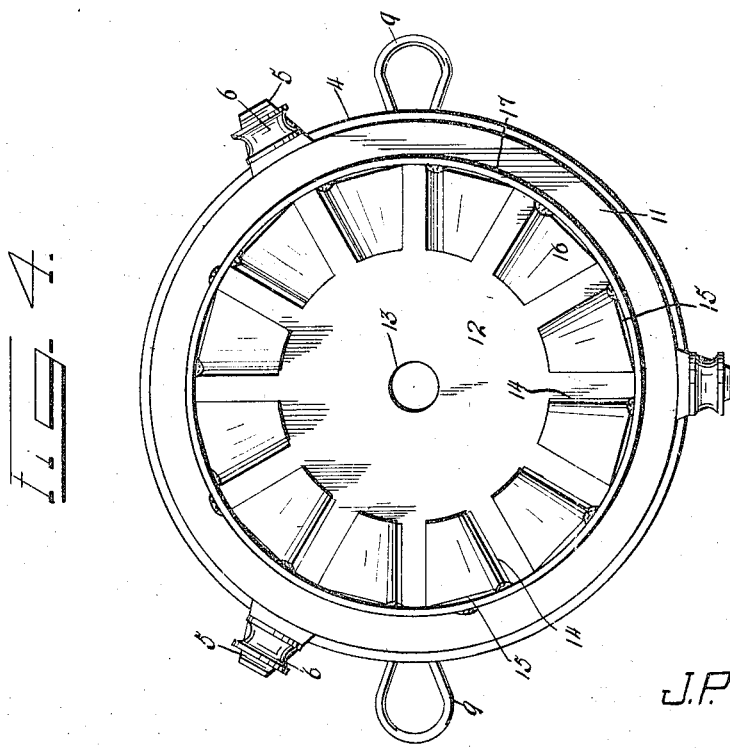

JOHN P. CHARLES, OF LAPORTE CITY, IOWA.

DISH-WASHING MACHINE.

1,069,673.   Specification of Letters Patent.   Patented Aug. 12, 1913.

Application filed April 20, 1911. Serial No. 623,303.

*To all whom it may concern:*

Be it known that I, JOHN P. CHARLES, a citizen of the United States, residing at Laporte City, in the county of Blackhawk, State of Iowa, have invented certain new and useful Improvements in Dish-Washing Machines; and I do hereby declare the following to be a full, clear, and exact description of the invention, such as will enable others skilled in the art to which it appertains to make and use the same.

This invention relates to improvements in dish washing machines and has for its object to provide a machine of this character, which is simple in construction, durable, and one which may be easily operated with the desired results.

It is also my purpose to provide a dish washing machine embodying a dish receptacle or container suspended within an outer casing, the construction being such that in the operation of the washer when the dish container is rotated the water will be caused to circulate so as to clean the dishes, and then carry the refuse material from the dishes to the outer casing.

In the drawings:—Figure 1 is a side elevation of the cleaner. Fig. 2 is a vertical sectional view. Fig. 3 is a top plan view. Fig. 4 is a bottom view of the dish receptacle. Fig. 5 is a side elevation of the dish receptacle removed from the can or boiler.

Referring to the drawings, the numeral 1 designates a cylindrical can or boiler having its upper edge provided with a wire filled beading 2. Suitably secured to the side of the can 1 are handles 3.

Adapted to be supported within the can 1 and upon the beading 2 is a dish receptacle 4, said receptacle having secured near its upper edge a plurality of brackets 5, each of said brackets being provided with a grooved roller 6, said rollers being adapted to travel upon the beading 2 when the receptacle 4 is rotated in either direction.

The upper edge of the dish receptacle 4 is bent over so as to form a beading 7, and in which is mounted a single length wire 8, said wire being so formed as to provide oppositely disposed looped handles 9. It will be noted that the beading 7 is formed with oppositely disposed cut away portions 10, and through which the looped handles 9 may be projected upwardly.

The bottom 11 of the dish receptacle 4 is formed with a central flat portion 12, having a central opening 13 the purpose of which will be hereinafter described. That portion of the bottom between the central portion 12 and outer edge of the bottom 11 is formed with a series of radial incisions 14 and concentric incisions 15 which when formed produce blades 16, said blades necessarily having their front edges projected in the same direction and being struck out from the bottom, so that the edges of the same will be positioned below the bottom plane of said bottom.

Soldered to the bottom, and upon its under side is a rim 17, said rim encircling the blades 16. Each outer corner of the blades 16 is soldered to the inner side of the rim 17 so as to hold the same rigidly. The rim 17 not only acts to hold the blades 16 in their proper position, but will protect the same when the dish receptacle 4 is placed upon a table or the like. The rim 17 further acts as a baffle so that when the receptacle 4 is rotated in a forward direction the water in the can 1 will be directed through the openings 18 formed by the struck out blades 16.

Secured to the central portion 12, and upon the upper side thereof is a supporting rack consisting of inner and outer rings 19 and 20 respectively, and by which the cups to be washed are supported in a reverse position so that one edge will rest against the inner ring. Plates or saucers are then placed with their edges resting upon the bottom 11 and supported in an inclined position by the cups, as shown in dotted lines in Fig. 2 of the drawings. From this construction it will be seen that when the cups and plates or the like are in their position to be washed, an unobstructed passage for circulation of the water through the opening 13 is formed.

It will be noted that the bottom of the dish receptacle 4 is supported a sufficient distance above the bottom of the can 1 to provide a space for the water of greater area than that of the dish receptacle 4.

The operation of the device is as follows: The boiling water is placed within the can 1, or said can is placed upon the stove until the water reaches a boiling point. The articles to be washed are placed in their proper position within the dish receptacle 4, and placed within the can 1, after the same has been removed from the stove and the water is of sufficient temperature to thoroughly wash the articles, said dish receptacle is rapidly rotated within the can 1, which causes the water to circulate upwardly and impinging against the inner wall of the dish receptacle, said circulation having what might be considered a whirling motion, so that when the same has acted to clean the dishes, and has passed upwardly through the same the whirling motion will tend to form an eddy which being directed downwardly will carry the refuse through the opening 13. It is only necessary that the dish receptacle be rapidly rotated three or four times in the direction in which the blades project which will cause the circulation just described, and the same may then be rotated in a reverse direction slowly for a few minutes. The dishes may then be taken from the receptacle and rinsed with clean hot water.

What is claimed is:—

1. In a dish washing machine, the combination with an outer receptacle provided with a flange at the upper end thereof, of an inner receptacle located within the outer receptacle and spaced apart therefrom, said inner receptacle rotatably bearing on the flange of the outer receptacle, a bottom secured to the lower end of the inner receptacle and provided with downwardly extending wings, said bottom having an opening therein, a flange secured to the bottom and engaging the wings, and concentrically arranged dish supporting members surrounding the central opening of the bottom.

2. The combination with an outer receptacle provided with a flange at the top end thereof, an inner receptacle rotatably bearing on said flange, a bottom portion for the inner receptacle, provided with a series of wings, said bottom portion having an opening therein, and a plurality of dish supporting rings mounted upon the bottom portion above the same and surrounding the opening therein.

In testimony whereof, I affix my signature, in presence of two witnesses.

JOHN P. CHARLES.

Witnesses:
PERCY HAVEN,
F. W. KOBY.